United States Patent

Kono et al.

[11] Patent Number: 6,165,262
[45] Date of Patent: Dec. 26, 2000

[54] CEMENT ADDITIVE AND CEMENT COMPOSITION USING SAME

[75] Inventors: Katsuyuki Kono; Tsutomu Yuasa, both of Osaka; Tsuyoshi Hirata, Hyogo, all of Japan

[73] Assignee: Nippon Shokubai Co., Ltd., Osaka, Japan

[21] Appl. No.: 09/234,387

[22] Filed: Jan. 20, 1999

[30] Foreign Application Priority Data

Jan. 20, 1998 [JP] Japan .................................. 10-009133

[51] Int. Cl.$^7$ .................................................. C04B 24/24
[52] U.S. Cl. ........................ 106/802; 106/724; 106/823; 524/4
[58] Field of Search ..................................... 106/724, 802, 106/823; 524/4

[56] References Cited

U.S. PATENT DOCUMENTS

| | | | |
|---|---|---|---|
| 3,196,122 | 7/1965 | Evans et al. | 427/140 |
| 4,157,998 | 6/1979 | Berntsson et al. | 524/5 |
| 4,239,113 | 12/1980 | Gross et al. | 206/568 |
| 4,888,059 | 12/1989 | Yamaguchi et al. | 106/823 |
| 5,614,017 | 3/1997 | Shawl | 106/823 |
| 5,670,578 | 9/1997 | Shawl | 525/187 |

FOREIGN PATENT DOCUMENTS

| | | | |
|---|---|---|---|
| 0 273 711 A1 | 7/1988 | European Pat. Off. | C04B 24/26 |
| 0 348 565 | 1/1990 | European Pat. Off. | C08L 51/00 |
| 1 264 052 | 10/1961 | France . | |
| 1 257 049 | 12/1967 | Germany . | |
| 55-126553 | 9/1980 | Japan . | |
| 56-022359 | 3/1981 | Japan . | |
| 56-022360 | 3/1981 | Japan . | |
| 3-131553 | 6/1991 | Japan . | |
| 08157820 | 6/1996 | Japan . | |
| 8-225353 | 9/1996 | Japan . | |
| 9-71147 | 3/1997 | Japan . | |
| WO 91/02703 | 3/1991 | WIPO | C04B 24/24 |

OTHER PUBLICATIONS

Chemical Abstracts vol. 105, No. 10, Sep. 8, 1986, Columbus, Ohio, Abract No. 84233a, Fujio et al., p. 344 XP002101510 and JP 61 031333 A.

*Primary Examiner*—Anthony Green
*Attorney, Agent, or Firm*—Fish & Richardson P.C.

[57] ABSTRACT

A novel cement admixture is provided which fulfills the function as a thickener basically, possesses an ability to inhibit segregation of materials, excels in workability as well, and permits a decrease in the amount of addition while keeping these functions intact. The cement admixture is characterized by comprising a cement additive formed of a polymer resulting from polymerizing a monomer mixture having methyl acrylate as a main component thereof and a cement water reducing agent.

6 Claims, No Drawings

CEMENT ADDITIVE AND CEMENT COMPOSITION USING SAME

FIELD OF THE INVENTION

This invention relates to a cement additive and a cement composition using the additive.

DESCRIPTION OF RELATED ART

At present, in the field of cement additives which are materials other than cement, aggregate, and water, diligent researches are being pursued regarding compositions of a great variety of new additives such as cement water reducing agent, high-range water reducing agent, plasticizer agent, air entraining agent, retardor, accelerating agent, hydration heat inhibitor, and drying shrinkage allaying agent and functions and effects thereof with a view to controlling the hydration hardening of cement and improving the quality of the concrete to be produced. In the existing circumstances, various cement additives endowed with complicated functions and properties have been proposed.

Specifically, in a cement composition comprising cement, water, and a polymer or comprising cement, water, an aggregate, and a polymer, a cement composition characterized by using as the polymer an emulsion copolymer using an α,β-monoethylenically unsaturated carboxylic acid as an essential monomer is disclosed in JP-A-03-131,553. The cement composition disclosed in the patent publication mentioned above is claimed to acquire an unusually high water retaining property when gelated under an alkaline atmosphere and, owing to the high water retaining activity, solve such troubles as decay and dryout during the course of mold release.

A composition of the range high-range water reducing agent characterized by being formed of an aqueous mixture consisting of a vinyl polymer emulsion and a water-soluble vinyl copolymer and increasing the viscosity thereof to more than twice the original level in the area of liquid property of not less than pH 9 is disclosed in JP-A-09-71,447. The high-range water reducing agent composition disclosed in the patent publication mentioned above is claimed to be capable of permitting simultaneous impartation of high fluidifying property and material segregation inhibiting property as expected to a cement compound manufactured by using the high-range water reducing agent composition.

Further, a high fluidity concrete additive comprising a copolymer emulsion wit contains a free carboxylic acid groups offered from a monomer components in the polymer chain is disclosed in JP-A-08-225,353. The invention relating to the high fluidity concrete additive disclosed in the patent publication mentioned above is claimed to allow manufacture of a high fluidity concrete which excels in fluidifying property and packing property and in segregation inhibiting property as well.

In the cement additives so disclosed heretofore, alkyl acrylates are mentioned as one species of other monomers which are copolymerizable with a main component discharging a direct and important role in conferring various complex functions and properties on a cement compound and are therefore capable of serving not as the main component but rather as an arbitrary or supplementary component. Regarding the alkyl acrylates which are only one species of other monomer components, however, the question as to what functions and effects they are capable of bringing on the cement compound has not received so important a consideration as the main component. Barely, the specification of JP-A-03-131,553 has a mention to the effect that the other monomer component is preferred to have such low solubility in water as an alkyl acrylate. Regarding methyl acrylate which is one concrete example of the alkyl acrylates, therefore, absolutely no report has been made as to the peculiar function and effect that can be manifested by this specific alkyl acrylate on the cement compound. The case of using methyl acrylate as another monomer is not reported in the concrete working examples and comparative examples cited in the patent publications mentioned above.

As respects these conventional cement additives, efforts have been exerted with a view to developing a novel additive endowed anew with various complicated functions and properties. Absolutely no specific component, however, has been demonstrated to contribute effectively to the formulation of the efficiency of work which constitutes itself the technical task to be solved when the cement composition is manufactured by actually using the additive in question, particularly such factors as cutting greatly the time spent in kneading a cement composition, improving the efficiency of work in manifesting one same effect, and decreasing the amount of the additive required to be added in obtaining one and the same effect.

An object of this invention, therefore, is to provide a novel cement additive which possesses the function of a thickener basically, further displays the ability to inhibit material segregation, moreover excels in workability, and allows a decrease in the amount to be added while keeping these functions intact, a cement admixture containing the cement additive, and a cement composition using the cement admixture.

SUMMARY OF THE INVENTION

The present inventors have made a diligent study on the cement additive and the cement composition using the cement additive mentioned above. They have been consequently ascertained that the polymer obtained by polymerizing a monomer component having as a main constituent thereof methyl acrylate among other alkyl acrylates is capable of manifesting peculiar function and effect of combining both the function as a thickener and a segregation inhibitor, promoting the improvement of the efficiency of work, and promoting the decrease of the amount of addition of the additive necessary for obtaining one and the same effect while keeping the functions intact. The present invention has been perfected based on this knowledge.

Specifically, the first object of this invention is accomplished by (1) a cement additive incorporating therein a polymer obtained by polymerizing a monomer component having methyl acrylate as a main component thereof. The first object is further accomplished by (2) a cement additive set forth in (1) above, which is characterized by the fact that the polymer is obtained by polymerizing a monomer component containing the component of methyl acrylate in the range of 100 wt. %–40 wt. %.

The first object of this invention is further accomplished by (3) a cement additive set forth in (1) above, characterized by the fact that the monomer component further contains (meth)acrylic acid.

The first object of this invention is further accomplished by (4) a cement additive set forth in (1) above, characterized by the fact that the monomer component contains a (meth)acrylate other than methyl acrylate.

The first object of this invention is further accomplished by (5) a cement additive set forth in (1) above, which is an aqueous solution or an aqueous dispersion.

The first object of this invention is further accomplished by (6) a cement additive set forth in (1) above, which is solid.

The second object of this invention is accomplished by (7) a cement admixture, characterized by containing a cement additive set forth in (1) or (2) above and a cement water reducing agent.

The third object of this invention is accomplished by (8) a cement composition containing a cement additive set forth (1) or (2) above and cement.

The third object of this invention is further accomplished by (9) a cement composition containing a cement admixture set forth in (7) and cement.

DESCRIPTION OF PREFERRED EMBODIMENT

The cement additive of this invention is characterized by comprising a polymer obtained by polymerizing a monomer component having methyl acrylate as a main component thereof (hereinafter occasionally referred to simply as "a polymer having methyl acrylate as a main component thereof").

(A) Monomer component having methyl acrylate as a main component thereof

The polymer having methyl acrylate as a main component is known in two types, i.e. a homopolymer obtained by polymerizing methyl acrylate as a polymerizing monomer component and a copolymer obtained by copolymerizing methyl acrylate as a monomer component with a monomer component copolymerizable therewith. In the case of the copolymer, methyl acrylate is used in the largest amounts in all the monomers to be used, namely methyl acrylate is used as a main component. The copolymer contains preferably 40–100 wt. %, more preferably 50–100 wt. %, of methyl acrylate. If the amount of methyl acrylate as a main component is less than 40 wt. % of the monomer components, the shortage will be at a disadvantage in precluding manifestation of such peculiar functions and effects of this invention as combining the function of a viscosity enhancer and the function of amaterial segregation inhibitor, offering excellent efficiency of work, and promoting a reduction in the amount necessary for manifesting one and the same function and effect and meanwhile keeping these operations intact. The preferred range of the amount of the methyl acrylate is specified herein from the viewpoint that a polymerizing monomer component is not enabled to manifest the function thereof effectively unless it is contained in an amount exceeding a fixed level.

The question why the polymer having methyl acrylate as a main component thereof is capable of manifesting these functions at all has not yet been elucidated. It is suspected, however, that this phenomenon has some bearing on the theory that the methyl acrylate in the polymer is quickly hydrolyzed in an alkaline atmosphere and consequently caused to form a carboxyl group.

As the other polymerizing monomer components than the methyl acrylate mentioned above, the known components available for various additives and capable of manifesting various functions and properties are conceivable. Those components which are capable of manifesting the effects aimed at can be particularly advantageously utilized. These components do not need to be regarded as exclusive examples. Those monomer components which are copolymerizable with methyl acrylate at all are adoptable as well.

As concrete examples of the other polymerizing monomer component, carboxyl group-containing polymerizing monomers such as (meth)acrylic acid, itaconic acid, crotonic acid, maleic acid, and maleic anhydride; sulfonic acid group-containing polymerizing monomers such as vinyl sulfonic acid, styrene sulfonic acid, and sulfoethyl (meth)acrylate; acidic phosphoric ester type polymerizing monomers such as 2-(meth)acryloyloxyethyl acid phosphate, 2-(meth) acryloyloxypropyl acid phosphate, 2-(meth)acryloyloxy-3-chloropropyl acid phosphate, and 2-(meth)acryloyl-oxyethylphenyl phosphate; styrene derivatives such as styrene, vinyl toluene, a-methylstyrene, and chloromethyl styrene; (meth)acrylamide derivatives such as (meth)acryl amide, N-monomethyl (meth)acrylamide, N-monoethyl (meth)acrylamide, and N,N-dimethyl (meth)acrylamide; (meth)acrylates which are esters of (meth)acrylic acid with C1–C18 alcohols such as methyl (meth)acrylate, ethyl (meth)acrylate, and butyl (meth)acrylate; cyclo alkyl group-containing polymerizing monomers such as cyclohexyl (meth)acrylate; hydroxyl group-containing (meth) acrylic esters such as 2-hydroxyethyl (meth)acrylate, 2-hydroxypropyl (meth)-acrylate, and monoesters of (meth)acrylic acid with polypropylene glycol; polyethylene glycol chain-containing polymerizing monomers such as polyethylene glycol (meth)acrylic esters; (meth) acrylonitrile; N-vinyl pyrrolidone; basic polymerizing monomers such as dimethylaminoethyl (meth)acrylate, dimethylaminoethyl (meth) acrylamide, and dimethylaminopropyl (meth)acrylamide, vinyl pyridine, and vinyl imidazole; cross-linking (meth) acrylamides such as N-methylol (meth)acrylamide and N-butoxyethyl (meth)acrylamide; polymerizing monomers such as vinyl trimethoxy silane, vinyl triethoxy silane, γ-(meth)acryloyl propyltrimethoxy silane, vinyl tris(2-methoxyethoxy) silane, and allyl triethoxy silane which have a hydrolyzing silicon group coupled directly with a silicon atom; epoxy group-containing polymerizing monomers such as glycidyl (meth)acrylate and acryl glycidyl ether; oxazoline group-containing polymerizing monomers such as 2-isopropenyl-2-oxazoline and 2-vinyl oxazoline; aziridine group-containing polymerizing monomers such as 2-aziridinyl ethyl (meth)acrylate and (meth)acryloyl aziridine; halogen-containing polymerizingmonomers such vinyl fluoride, vinylidene fluoride, vinyl chloride, and vinylidene chloride; polyfunctional (meth)acrylic esters having two or more unsaturated group in the molecular such as products of esterification of (meth)acrylic acid with such polyhydric alcohols such as ethylene glycol, 1,3-butylene glycol, diethylene glycol, 1,6-hexane diol, neopentyl glycol, polyethylene glycol, propylene glycol, polypropylene glycol, trimethylol propane, pentaerythritol, and dipentaerythritol; polyfunctional (meth)acrylamides having two or more unsaturated group in the molecular such as methylene bis (meth)acrylamide; polyfunctional allyl compounds having two or more unsaturated group in the molecular such as diallyl phthalate, diallyl malate, and diallyl fumarate; and (meth)acryl allyl and divinyl benzene may be cited. The polymerizing monomers other than methyl acrylate and the polymerizing polyfunctional monomers mentioned above may be used either singly or in the form of a mixture of two or more members. As the polymerizing monomer component other than methyl acrylate for the purpose of this invention, (meth) acrylic acid or a (meth) acrylic ester is used preferably over the other monomers cited above.

(B) Method for production of polymer having methyl acrylate as a main component thereof The method to be adopted for the production of the polymer having methyl acrylate as a main component thereof does not need to be particularly limited but may be arbitrarily selected from among known methods such as, for example, bulk, solution, dispersion, and suspension polymerization. The polymer can be easily obtained particularly by (1) polymerizing methyl acrylate by the known method of emulsion polymerization using an emulsifier, initiator, chain transfer agent, etc. which are also known or (2) polymerizing methyl acrylate and a polymerizing monomer component other than methyl acrylate as combined at a ratio mentioned above by the known method of emulsion polymerization using an emulsifier, initiator, chain transfer agent, etc. which are also known.

As the emulsifier, any of the all species of surfactants including anionic surfactants, nonionic surfactants, cationic surfactants, amphoteric surfactants, and polymer surfactants can be used. The polymerization, as occasion demands, may be carried out by without an emulsifier.

As concrete examples of the anionic surfactant which is used effectively herein, alkyl sulfates such as sodium dodecyl sulfate, potassium dodecyl sulfate, and ammonium alkyl sulfates; sodium dodecyl polyglycol ether sulfate; sodium sulfolisinoate; alkyl sulfonates such as sulfonated paraffin salts; alkyl sulfonates such as alkalimetal sulfates of sodium dodecylbenzene sulfonate and alkali phenol hydroxyethylene; hi-alkyl naphtalene sulfonic acid, fatty acid salts such as naphthalene sulfonic acid-formalin condensate, sodium laurate, triethanol amine oleate, and triethanol amine ahiate; sulfuric ester salts of polyoxyalkyl ether; sulfuric ester salts of polyoxy ethylene carboxylic acid; sulfuric ester salts of polyoxy ethylene phenyl ether; sulfonic acid salts of succinic dialkyl esters; and reactive anionic emulsifiers such as polyoxyethylene alkyl allyl sulfate which have a polymerizable double bond may be cited.

As concrete examples of the nonionic surfactant mentioned above, polyoxyethylene alkyl ether; polyoxyethylene alkyl aryl ether; sorbitan aliphatic esters; polyoxyethylene sorbitan aliphatic esters; aliphatic monoglycerides such as monolaurate of glycerol; and polyoxyethylene-oxypropylene copolymer, condensation products of ethylene oxide with aliphatic amine, amide with acid may be cited.

As concrete examples of the polymer surfactant mentioned above, polyvinyl alcohol and modifiers thereof; (meth)-acrylic acid type water-soluble polymers; hydroxyethyl (meth) acrylic acid type water-soluble polymers; hydroxypropyl (meth) acrylic acid type water-soluble polymers, and polyvinyl pyrrolidone may be cited.

When the emulsifier mentioned above is used, the amount thereof is only required to manifest the function of promoting the formation of emulsion and stabilizing the formed emulsion. The amount of use, therefore, is generally in the range of 0.1–10 wt. %, preferably 1–5 wt. %, based on the total amount of methyl acrylate and a polymerizing monomer other than the methyl acrylate. If the amount of the emulsifier to be used is less than 0.1 wt. %, the emulsion polymerization will suffer serious loss of stability, the polymerization will coagulate. Conversely, if this amount exceeds 10 wt. %, the excess will be at a disadvantage in retarding the setting of the cement composition and suffering the cement composition to entrain air in an unduly large amount.

The initiator mentioned above is a substance which is decomposed by heat and caused to generate molecules bearing radicals. As concrete examples of the initiator, persulfates such as potassium persulfate, ammonium persulfate, and sodium persulfate; water-soluble azo type compounds such as 2,2'-azobis( 2-amidinopropane) dichlorate and 4, 4'-azobis (4-cyanopentanic acid); pyrolytic initiators such as hydrogen peroxide; and redox type initiators such as the combination of hydrogen peroxide with ascorbic acid, that of t-butyl hydroperoxide with Rongalite, that of potassium persulfate with a metal salt, and that of ammonium persulfate with sodium hydrogen sulfite which effect generation of molecules bearing radicals in consequence of an oxidation-reduction reaction between an oxidizing agent and a reducing agent may be cited. These initiators may be used either singly or in the form of a mixture of two or more members.

The amount of the initiator to be used is only required to suffice manifestation of the necessary function of easily generating free radicals or ions and initiating the polymerization by a chain reaction. Specifically, this amount is generally in the range of 0.001–1 wt. %, preferably 0.01–0.5 wt. %, based on the total amount of methyl acrylate and the polymerizing monomer other than the methyl acrylate mentioned above. If the amount of the initiator to be used is less than 0.001 wt. %, the shortage will notably delay the polymerization or preclude initiation of the polymerization. Conversely, if this amount exceeds 1 wt. %, the polymerization will coagulate.

During the emulsion polymerization mentioned above, it is permissible to add a varying known hydrophilic solvent or such additives as well described specifically herein below properly to the reaction system as occasion demands on the condition that these additives are used in amounts incapable of exerting any adverse effect on the properties of the polymer being produced. During the manufacture of the emulsion polymer, a chain transfer agent may be used for adjusting the molecular weight of the product. As concrete examples of the chain transfer agent, t-dodecyl mercaptan (1,1-dimethyldecane-1-thiol), 1-hexadecane thiol, 1,10-decane thiol, 1,8-dimethyl mercapto-3,6-dioxaoctane, 1,5, 10-decane trithiol, 2-ethylhexyl mercapto-propionate, 2-mercaptoethyl octanate, carbon tetrachloride, carbon tetrabromide, α-methylstyrene dimer, terpinolene, α-terpinene, β-terpinene, dipentene, allyl alcohol, and 2-amino-propanol may be cited.

For the purpose of promoting the emulsion polymerization, a reducing agent such as, for example., sodium pyrobisulfite, sodium sulfite, sodium hydrogen sulfite, ferrous sulfate, formaldehyde sodium sulfoxylate, L-ascorbic acid, or a salt thereof and a chelating agent such as, for example, sodium ethylene diamine tetraacetate or glycine may be additionally used. Besides, a dispersant such as, for example, polysodium acrylate, an electrolyte such as, for example, potassium chloride, disodium phosphate, trisodium phosphate, diammonium phosphate, sodium pyrophosphate, or sodium tripolyphosphate; a pH buffer may be additionally used.

The addition of the polymerizing monomer to the system of polymerization reaction is not particularly discriminated by the kind of method to be adopted. Any method selected arbitrarily from various known methods such as, for example, add for once of monomer, dropwise addition of monomer, dropwise addition of preemulsion, power feeding, addition in the form of seeds, and multistage addition may be adopted.

(C) Cement additive

As the cement additive of this invention, the reaction solution of the aforementioned polymer having methyl acrylate as a main component may be used either in its unmodified form or in a diluted form. When the reaction solution is soluble in water, the relevant aqueous solution, or when the reaction solution is an emulsion, the relevant emulsion is used either in its unmodified form or in a form diluted with water.

The non-volatile component which occurs at the end of the emulsion polymerization mentioned above is preferred to account for a proportion of not more than 60 wt. %. If the proportion of the non-volatile component exceeds 60 wt. %, the product of the emulsion polymerization will acquire an unduly high viscosity, fail to retain stability of dispersion, and coagulation.

The polymer which is obtained by the method of emulsion polymerization has a number average molecular weight determined by the GPC method generally in the range of 100,000–10,000,000, preferably 500,000–2,000,000. If the number average molecular weight is less than 100,000, the cement composition will suffer the separation allaying property thereof to fall markedly. If the number average molecular weight exceeds 10,000,000, the cement composition will suffer degradation of the flowing property. When the polymer obtained by the method of emulsion polymerization is put to storage in the form of an emulsion, the pH of this polymer may be properly retained generally in the range of 1–7 in due consideration of the stability of emulsion. The dispersion having a particle diameter of less than 0.001 $\mu$m is unfit for the use contemplated herein because of the high viscosity of emulsion under the condition of a low solid content or demand of large amount of emulssitier on account of the fact that the particles have a considerably larger surface area and the amount of the emulsifier required is proportionately increased. The dispersion which has a particle diameter exceeding 1 $\mu$m is likewise unfit for the use because it is not easily produced by the standard procedure of emulsion polymerization and the dispersion fails to remain stably as an emulsion and suffers sedimentation of particles.

The polymer resulting from the polymerization which is performed by the method described above may be converted by the method of dry pulverization, method of salting-out, method of coagulation, method of freeze drying, method of spray drying, method of drum drying, and method of belt drying, for example, into dry powder or slurry and may be used as a cement additive. The cement additive of this invention, therefore, is allowed to assume a solid state.

The method of freeze drying is capable of producing a powder having a particle diameter of not more than several $\mu$m by suddenly cooling and freezing a given emulsion as by the use of liquefied nitrogen and then drying the frozen emulsion with a freeze driver under a reduced pressure.

The method of spray drying is capable of producing a powder having a particle diameter of not more than 100 $\mu$m by atomizing a given emulsion with a spray drier and mixing the resultant suspended particles of emulsion with hot air thereby effecting desiccation thereof in the air.

The method of drum drying is capable of producing a powder having a particle diameter of not more than 300 $\mu$m by applying a given emulsion in the form of a film, not more than 100 $\mu$m in thickness, to a drum drier or belt drier and consequently drying the film of emulsion, pulverizing the dried film, and classifying the powder.

The method of coagulation is capable of producing by placing a given emulsion and an aqueous coagulator solution in a kneader in motion thereby inducing coagulation of the emulsion as a whole, kneading to wash the resultant mixture several times with deionized water, crushing the cleaned bulk of emulsion into coagulation, about 2–3 mm in diameter, then drying the coagulation with a reduced pressure drier at a room temperature under a reduced pressure, and finally pulverizing and classifying the dried powder having a particle diameter of not more than 300 $\mu$m. As concrete examples of the coagulator to be effectively used herein, aluminum sulfate, calcium chloride, zinc chloride, and cationic polymer type flocculant may be cited.

When the polymer is used in the form of a dry powder or a slurry, it is proper for this polymer to acquire a particle diameter generally in the range of 1–10000 $\mu$m, preferably 10–1000 $\mu$m. If the particle diameter is less than 1 $\mu$m, the particles will grow unduly in bulk, tend to scatter in the air, and allow no easy handling. Even in the slurry form, such small particles will compel the slurry itself to acquire an unduly high viscosity approximating closely to the level of a gel and offer no easy handling. If the particle diameter exceeds 10000 $\mu$m, the particles will not quickly dissolve and require a long time in acquiring sufficient viscosity and segregation inhibiting. As a result, the productivity of concrete is lowered and the convenience with which the fine adjustment of flowability is attained by the amount of addition is fairly diminished.

In terms of the state of aggregate, the cement additive of this invention may be properly in any of the forms of aqueous solution, aqueous dispersion (emulsion), or solid.

The cement additive which contains the polymer having methyl acrylate as a main component thereof is characterized by the fact that this cement additive does not dissolve in acidic or neutral water but that, when the cement additive is placed in an alkali such as an aqueous alkali solution or cement paste, the polymer partly or wholly dissolves and acquires high viscosity because the methyl acrylate in the polymer gradually succumbs to hydrolysis and forms a carboxyl group. In order for the cement composition to excel in flowability and segregation inhibiting property, the cement additive of this invention which is formed of the polymer having methyl acrylate as a main component thereof proves particularly effective when it has a quality such the polymer, in water containing this polymer at a concentration of 1 wt. %, partly or wholly dissolves at pH 9 and acquires a viscosity in the range of 50–5000 mPa·s. The speed of solution in the alkali can be increased by causing the polymer having methyl acrylate as a main component to be copolymerized with a hydrophilic monomer possessing a carboxyl group, a hydroxyl group, or a polyethylene glycol chain. This copolymerization is not always necessary. The polymer manifests good properties by merely having methyl methacrylate as a main component thereof.

The proportion in which the cement additive containing the polymer having methyl acrylate as a main component thereof is incorporated in the cement composition can be suitably selected, depending on the purpose for which the cement composition is used or the kind of application. It suffices to incorporate the cement additive in an amount such that the effect of the cement additive may exalt to the highest allowable extent within which such properties as viscosity enhancing activity and material segragation inhibiting activity aimed at by the cement additive may be advantageously manifested and functions and effects necessary for enhancing the workability during the manufacture of cement compositions such as concrete, mortar, and cement paste may be favorably manifested in addition to the activities mentioned above. This mount does not need to be particularly limited. It is, however, preferable for the cement to incorporate the cement additive containing the polymer having methyl acrylate as a main component thereof in an amount in the range of 0.001–5 wt. %, preferably 0.01–1 wt. %, as dry resin or solid component based on the weight of the cement. If the content of the cement additive containing the polymer having methyl acrylate as a main component is less than 0.001 wt. %, the cement will possibly fail to acquire a sufficient segregation inhibiting property. Conversely, if the content of the cement additive containing the polymer having methyl acrylate as a main component exceeds 5 wt. %, the cement composition such as concrete will be deficient in flowability.

(D) Cement admixture

The cement admixture of this invention includes a type which combines the cement additive containing the polymer having methyl acrylate as a main component with other suitable components, depending on the purpose of use and the kind of application.

In order that the manufacture of the cement composition using the cement admixture of this invention may acquire fine workability, the cement admixture is preferred to incorporate therein the cement additive containing the polymer having methyl acrylate as a main component thereof and fulfilling the function of a thickener and any of heretofore known cement water reducing agent. This is because the cement composition enjoying fine workability can be obtained easily and infallibly by using the cement additive and the cement water reducing agent together, preparatorily diluting with water at least the cement water reducing agent or preferably both the cement water reducing agent and the cement additive, and adding the product of dilution into the mixing system and mixing it therein.

The cement water reducing agent arbitrarily selected from the known products does not need to adhere strictly to the designation. It is a surfactant which is capable of adhering to the surface of cement particles and inducing a repelling activity between the adjacent cement particles and, owing to this behavior, decreasing the unit amount of water in the cement composition such as concrete and enhancing the strength thereof. It may be endowed, as occasion demands, with other varying activity. An air entraining and water reducing agent furnished with an air entraining activity, a high-range water reducing agent capable of obtaining a cement composition such as high-strength concrete by markedly lowering the water-cement ratio, and a fluidifying agent which is a high-range water reducing agent possessed of the effect of retaining high workability for a prescribed length of time without a sacrifice of the quality of a cement composition such as stiff concrete and used for a cement composition such as a fluidifying concrete are examples. A wide variety of products developed to date such as those which are referred to as cement water reducing agent, air entraining and water reducing agent, high-range water reducing agent, high-range air entraining and water reducing agent, plasticizer, and cement dispersant can be adopted in addition to those which, though designated simply as cement or concrete admixtures, are judged from the constituents thereof to be embraced in cement water reducing agents.

As concrete examples of the cement water reducing agent, lignin sulfonates; polyol derivatives; naphthalene sulfonic acid-formalin condensates; melamine sulfonic acid-formalin condensates; polystyrene sulfonates; aminosulfonic acid type agents such as aminoarylsulfonic acid-phenol-formaldehyde condensates which are disclosed in JP-A-01-113,419; cement dispersants comprising a copolymer of a polyalkylene glycol mono-(meth)acrylic ester type compound with a (meth)acrylic acid type compound and/or a salt thereof as a component (a), a copolymer of a polyalkylene glycol mono(meth)allyl ether type compound with maleic anhydride and/or a hydrolyzate thereof and/or a salt thereof as component (b), and a copolymer of a polyalkylene glycol mono (meth) allyl ether type compound with a maleic ester of a polyalkylene glycol type compound and/or a salt as acomponent (c) as disclosed in JP-A-07-267,705, concrete admixtures comprising a copolymer of a polyalkylene glycol ester of (meth) acrylic acid with (meth) acrylic acid (or salt thereof) as a component A, a specific polyethylene glycol polypropylene glycol type compound as a component B, and a specific surfactant as disclosed in Japanese Patent No. 2,508,113, copolymers comprising a polyethylene (propylene) glycol ester or polyethylene (propylene) glycol mono(meth)allyl ether of (meth)-acrylic acid, (meth)allyl sulfonic acid (or salt thereof), and a (meth) acrylic acid (or a salt thereof) as disclosed in JP-A-62-216,950, ester of a polyethylene (propylene) glycol ester with (meth) acrylic acid, copolymers comprising (meth)allyl sulfonic acid (or a salt thereof) and (meth)acrylic acid (or a salt thereof) as disclosed in JP-A-01-226757, esters of (meth) acrylic acid with polyethylen(proplyen)glycol, copolymers comprising (meth)ally sulfonic acid (or salts thereof), or p-(meth)allyl-oxybenzenesulfonic acid (or salt thereof), (meth)acrylic acid (or salts thereof) as disclosed in JP-B-05-36,377, copolymers comprising a polyethylene glycol mono (meth) allyl ether and maleic acid (or a salt thereof) as disclosed in JP-A-04-149,056, a polyethylene glycol ester, copolymers comprising (meth)acrylic acid (or salts thereof), (meth)allyl sulfonic acid (or a salt thereof), (meth)acrylic acid (or a salt thereof), an alkane diol mono (meth) acrylate, a polyalkylene glycol mono(meth)acrylate, and an $\alpha,\beta$-unsaturated monomer containing an amide group in the molecular unit thereof as disclosed in JP-A-05-170,501, copolymers comprising a polyethylene glycol mono(meth)allyl ether, a polyethylene glycol mono(meth)acrylate, an alkyl ester of (meth) acrylic acid, (meth) acrylic acid (or a salt thereof), and a (meth)allyl sulfonic acid (or a salt thereof) or a p-(meth)allyloxybenzene sulfonic acid (or a salt thereof as disclosed in JP-A-06-191,918, copolymers of alkoxypolyalkylene glycol monoallyl ethers with maleic anhydride, or hydrolyzates or salts thereof as disclosed in JP-A-05-43,288, copolymers comprising polyethylene glycol monoallyl ether, maleic acid, and a monomer copolymerizable therewith, or salts or esters thereof as disclosed in JP-B-58-38,380, copolymers comprising a polyalkylene glycol mono(meth)acrylic ester type monomer, a (meth)acrylic ester type monomer, and a monomer copolymerizable therewith as disclosed in JP-B-59-18,338, copolymers comprising a (meth)acrylic ester containing a sulfonic acid group and optionally a monomer copolymerizable therewith or salts thereof as disclosed in JP-A-62-119,147, the products of esterification of a copolymer of an alkoxypolyalkylene glycol monoallyl ether with maleic anhydride and a polyoxyalkylene derivative possessing an alkenyl group at the terminal thereof as disclosed in JP-A-06-271,347, the products of esterification of a copolymer of an alkoxypolyalkylene glycol monoallyl ether with maleic anhydride and a polyoxyalkylene derivative possessing a hydroxyl group at the terminal thereof as disclosed in JP-A-06-298,555, and other similar polycarboxylic acids (or salts thereof) may be cited. These known cement water reducing agents may be used either singly or in the form of a mixture of two or more members.

The amount of the cement water reducing agent to be incorporated in the cement admixture of this invention cannot be definitely specified because it is variable with the kind of agent to be adopted. It suffices to incorporate the cement water reducing agent in an amount such that the effect of the cement water reducing agent may exalt to the highest allowable extent within which such effects as advantageously manifesting a water reducing activity aimed at and reducing the unit amount of water in the cement composition such as concrete and enhancing the strength thereof owing to the activity. This mount does not need to be particularly limited. It is, however, preferable for the cement additive to incorporate the cement water reducing agent in an amount in the range of 0.01–10 parts by weight, preferably 0.05–5 parts by weight, based on 100 parts by weight of the cement additive. This range is important because the cement water reducing agent used in an amount falling in this range bring various advantages such as accomplishing a high water reducing ratio, improving the slump loss preventing ability, reducing the unit amount of water, enhancing the strength of concrete, and improving the durability. If the content of the cement water reducing agent is less than 0.01 part by weight, the agent will possibly fail to manifest the water reducing activity sufficiently and fail to reduce the unit amount of water of the cement composition such as concrete. This insufficient use of the cement water reducing agent will not improve sufficiently the quality of the paste which is an unset cement composition such as neat concrete and will fail to improve the flowing property thereof. Conversely, if the content of the cement water reducing agent exceeds 10 parts by weight, the excess will bring no proportionate addition to the effect of the agent and consequently prove disadvantageous from the economic point of view.

(E) Other additives allowed to be incorporated

Further, the cement additive of this invention can be used in combination with such other known additives as are enumerated below.

(1) Water-soluble polymers: Unsaturated carboxylic acid polymers such as polyacrylic acid (sodium salt thereof), polymethacrylic acid (sodium salt thereof), polymaleic acid (sodium salt thereof), and sodium salt of acrylic acid-maleic acid copolymer; polymers of polyoxyethylene and polyoxypropylene such as polyethylene glycol and polypropylene glycol and copolymers thereof; nonionic cellulose ethers such as methyl cellulose, ethyl cellulose, hydroxymethyl cellulose, hydroxyethyl cellulose, carboxymethyl cellulose, carboxyethyl cellulose, and hydroxypropyl cellulose; $2 polysaccharides such as yeast glucan, xanthan gum, β-1.3 glucans (in a linear or branched configuration, such as, for example, curdlan, paramylon, bakiman, screloglucan, and laminaran) which are produced by microbial fermentation; polyacryl amide; polyvinyl alcohol; starch; starch phosphates; sodium alginate; gelatin; and copolymers of acrylic acid containing an amino group in the molecular unit thereof and products of quaternization thereof.

(2) Polymer emulsions: Copolymers of various vinyl monomers such as alkyl (meth)acrylates.

(3) Retarding agents: Oxycarbonic acids such as gluconic acid, glucoheptoic acid, arabonic acid, malic acid, and citric acid and inorganic salts or organic salts thereof with sodium, potassium, calcium, magnesium, ammonium, and triethanol amine; sugars including monosaccharides such as glucose, fructose, galactose, saccharose, xylose, abitose, ribose, and isomerized sugar, oligosaccharides such as disaccharides and trisaccharides, oligosaccharides such as dextrin, polysaccharides such as dextran, and molasses including such saccharides; sugar alcohols such as sorbitol; magnesium silicofluoride; malic acid and salts thereof and boric esters thereof; aminocarboxylic acids and salts thereof; alkali-soluble proteins; fumic acid, tannic acid; phenols; polyhydric alcohols such as glycerin; and phosphoric acids and derivatives thereof such as aminotri (methylenesulfonic acid), 1-hydroxyethylidene-1,1-diphosphonic acid, ethylenediamine tetra(methylenephosphoric acid), diethylenetriamine penta-(methylenephosphoric acid) and alkali metal salts and alkaline earth metal salts thereof.

(4) High-early strength agent-accelerator: Soluble calcium salts such as calcium chloride, calcium nitrite, calcium nitrate, calcium bromide, and calcium iodide; chlorides such as iron chloride and magnesium chloride, sulfates, potassium hydroxide; sodium hydroxide; carbonates; thiosulfates, formic acid and formates such as calcium formate; alkanol amines; alumina cement; and calcium aluminate silicate.

(5) Mineral defoamers: Kerosene and liquid paraffin.

(6) Oil and fat type defoamers: Animal and vegetable oils, sesame oil, castor oil, and alkylene oxide adducts thereof.

(7) Fatty acid type defoamers: Oleic acid, stearic acid, and alkylene oxide adducts thereof.

(8) Fatty ester type defoamers: Glycerin monoricinolate, alkenyl succinic acid derivatives, sorbitol monolaurate, sorbitol trioleate, and natural waxes.

(9) Oxyalkylene type defoamers: Polyoxyalkylenes such as (poly)oxyethylene (poly)oxypropylene adducts; (poly)oxyalkyl ethers such as diethylene glycol heptyl ether, polyoxyethylene oleyl ether, polyoxypropylene butyl ether, polyoxyethylene polyoxypropylene 2-ethylhexyl ether, and adducts of oxyethylene oxypropylene to higher alcohols having 12 to 14 carbon atoms; (poly)oxyalkylene (alkyl) aryl ethers such as polyoxypropylene phenyl ether and polyoxyethylene nonylphenyl ether; acetylene ethers such as 2,4,7,9-tetramethyl-5-decin-4,7-diol, 2,5-dimethyl-3-hexin-2,5-diol, and 3-methyl-1-butin-3-ol which result from addition polymerizing an alkylene oxide to acetylene alcohols; (poly) oxyalkylene fatty esters such as diethylene glycol oleic esters, diethylene glycol laurylic esters, and ethylene glycol distearic esters; (poly)oxyalkylene sorbitan fatty esters such as polyoxyethylene sorbitan monolauric esters and polyoxyethylene sorbitan trioleic esters; (poly) oxyalkylene alkyl(aryl) ether sulfuric ester salts such as sodium polyoxy propylene methyl ether sulfate and sodium polyoxyethylene dodecyl phenol ether sulfate; (poly) oxyalkylene alkyl phosphoric esters such as (poly) oxyethylene stearyl phosphoric esters; (poly)oxy-alkylene alkyl amines such as polyoxyethylene lauryl amine; and polyoxyalkylene amide.

(10) Alcohol type defoamers: Octyl alcohol, hexadecyl alcohol, acetylene alcohol, and glycols.

(11) Amide type defoamers: Acrylate polyamine, etc.

(12) Phosphoric ester type defoamers: tributyl phosphate, sodium octyl phosphate, etc.

(13) Metallic soap type defoamrs: Aluminum stearate, calcium oleate, etc.

(14) Silicone type defoamers: Dimethyl silicone oil, silicone paste, silicone emulsion, organic modified polysiloxanes (polyorganosiloxanes such as dimethyl polysiloxane), fluoro-silicone oil, etc.

(15) Air entraining agents: Resin soaps, saturated or unsaturated fatty acids, sodium hydroxystearate, lauryl sulfate, ABS (alkylbenzene sulfonic acid), LAS (linear alkylbenzene sulfonic acid), alkane sulfonates, polyoxyethylene alkyl (phenyl) ethers, sulfuric esters of polyoxyethylene alkyl (phenyl) ether and salts thereof, phosphoric esters of polyoxyethylene alkyl (phenyl) ether and salts thereof, proteinaceous materials, alkenyl succinic acid, α-olefin sulfonates, etc.

(16) Other surfactants:

Aliphatic monohydric alcohols such as octadecyl alcohol and stearyl alcohol which have 6–30 carbon atoms in the molecular unit thereof, alicyclic monohydric alcohols such as epiethyl alcohol which have 6–30 carbon atoms in the molecular unit thereof, monovalent mercaptans such as dodecyl mercaptan which have 6–30 carbon atoms in the molecular unit thereof, alkyl phenols such as nonyl phenol which have 6–30 carbon atoms in the molecular unit thereof, amines such as dodecyl amine which have 6–30 carbon atoms in the molecular unit thereof, polyalkylene oxide derivatives having not less than 10 mols of alkylene oxides such as ethylene oxide or propylene oxide to carbonic acids such as lauric acid or stearic acid which have 6–30 carbon atoms; alkyl diphenyl ether sulfonates resulting from etherification of two sulfone group-containing phenyl groups optionally substituted with an alkyl group or an alkoxy group; varying anionic surfactants; varying cationic surfactants such as alkyl amine acetate and alkyl trimethyl ammonium chloride; varying nonionic surfactants; and varying amphoteric surfactants.

(17) Waterproofing agents: Fatty acids (salts thereof), fatty esters, oils and fats, silicon, paraffin, asphalt, wax, etc.

(18) Corrosion inhibitors: Nitrites, phosphates, zinc oxide, etc.

(19) Crack reducing agents: polyoxyalkyl ethers; alkane diols such as 2-methyl-2,4-pentadiol, etc.

(20) Expanding agents: Ettringite type agents, coal type agents, etc.

As concrete examples of the other known additives, cement wetting agent, thickener, segregation inhibitor, flocculant, drying shrinkage reducing agent, strength enhancer, self-leveling agent, corrosion inhibitor, coloring agent, mildew preventive, blast furnace slag, fly ash, cinder ash, clinker ash, husk ash, silica hume, silica powder, and gypsum may be cited. These known additives may be used in the form of a mixture of two or more members.

(F) Use

The cement additive and the cement admixture of this invention which have been described above can be used for such cements, mortars, and concretes as high-fluidity concrete, antiwashout underwater concrete, shotcrete concrete, inversaly casting concrete, concrete molded by the (modified) ground-injection method, and concrete molded by the shield method as well as for the ordinary grades of mortar and concrete.

(G) Cement composition

The cement composition according to this invention comprises at least i) the cement additive containing the polymer having the methyl acrylate mentioned above as a main component and ii) cement. It, however, comprises i) the cement additive containing the polymer having the methyl acrylate mentioned above as a main component, ii) cement, and preferably iii) the cement admixture containing the aforementioned cement water reducing agent as an essential component thereof. When the cement additive of i) and the cement admixture of iii) above according to this invention are aqueous solutions and consequently contain water, the cement composition inevitably contains water. When they are solid and do not contain water, the cement composition is made to add water. The term "cement composition" as used in this invention is to be construed as embracing at least <1> a cement paste which results from compounding the aforementioned cement admixture, cement, and optionally incorporated water (which may be referred to simply as "paste" in the present specification), <2> a cement mortar which results from compounding the aforementioned cement admixture, cement, a fine aggregate, and optionally incorporated water (which may be referred to simply as "mortar" in the present specification), and <3> a cement concrete which results from compounding the aforementioned cement admixture, cement, an aggregate, and optionally incorporated water, the aggregate at least incorporating at least a coarse aggregate (which may be referred to simply as "concrete") in the present specification), though not exclusively.

The term "cement" as used herein refers to a cement composition which is subject to no particular restriction except for the requirement that it be usable for paste, mortar, or concrete. As concrete examples of the cement, portland cements of varying species such as ordinary cement, high-early-strength cement, ultra-high-early-strength cement, moderate heat cement, and white cement, high-belite content cement, high-alumina cement, fly ash cement, blast furnace slag cement, silica cement, and varying kinds of mixed cement may be cited. Such hydraulic materials other than cement as gypsum may be also embraced in the term "cement."

The amount of the cement to be incorporated in the cement composition mentioned above is suitably decided, depending on the purpose of use and the kind of application. Generally, for the purpose of imparting various properties such as fluidity and homogeneity which are generally hoped for by the cement composition such as concrete, the cement is properly contained in an amount in the range of 150–700 kg/m$^3$, preferably 200–650 kg/m$^3$, and more preferably 250–600 kg/m$^3$, based on 1 m$^3$ of the cement composition which is intended to incorporate the cement. If the content of the cement is less than 150 kg/m$^3{}_1$ the cement composition will fail to acquire sufficient strength owing to insufficient supply of cement. Conversely, if the content of the cement exceeds 700 kg/m$^3{}_1$ the cement composition such as concrete will acquire no sufficient strength because the unit amount of aggregate is not sufficient while the strength due to the cement is sufficient.

The term "fine aggregate" mentioned above refers to an aggregate which wholly passes a 10-mm sieve and not less than 85 wt. % of which passes a 5-mm sieve. As concrete examples of the fine aggregate, river sand, mountain sand, crushed sand, sea sand, fly ash, and artificial light-weight aggregate may be cited. These fine aggregates may be used either singly or in the form of a mixture of two or more members.

The amount of the fine aggregate to be incorporated in the cement composition is suitably decided, depending on the purpose of use and the kind of application. Generally, for the purpose of imparting various properties such as fluidity and homogeneity which are generally hoped for by the cement composition such as mortar and concrete, the fine aggregate is used in an amount in the range of 500–1500 kg/M$^3$, preferably 550–1200 kg/m$^3$, and more preferably 600–1000 kg/m$^3$, per 1 m$^3$ of the cement composition which is intended to incorporate the fine aggregate. If the content of the fine aggregate is less than 500 kg/m$^3$, the content of the coarse aggregate will automatically increase to the extent of easily inducing material segregation. Conversely, if the content of the fine aggregate exceeds 1500 kg/m$^3$, the segregation inhibiting property will begin its existence and impede the fluidity and the unit amount of aggregate will decrease to degrade the strength.

The term "coarse aggregate" mentioned above refers to an aggregate such that a 5-mm sieve stops not less than 85 wt. % thereof. As concrete examples of the coarse aggregate, river gravel, mountain gravel, crushed stone, sea sand, cobblestone, and blast furnace slag as well as light gravel as natural light-weight aggregate, and artificial light-weight aggregate may be cited. These coarse aggregates may be used either singly or in the form of a mixture of two or more members.

The amount of the coarse aggregate to be incorporated in the cement composition is suitably decided, depending on the purpose of use and the kind of application. Generally, for the purpose of imparting various properties such as fluidity and homogeneity which are generally hoped for by the cement composition such as mortar and concrete, the coarse aggregate is used in an amount in the range of 500–1500 kg/m$^3$, preferably 550–1200 kg/m$^3$, and more preferably 600–1000 kg/m$^3$, per 1 m$^3$ of the cement composition which is intended to incorporate the fine aggregate. If the content of the coarse aggregate is less than 500 kg/m³, the content of the coarse aggregate will be so small as to impede impartation of sufficient strength. Conversely, if the content of the coarse aggregate exceeds 1500 kg/M³, the excess will be liable to induce occurrence of the segregation inhibiting property.

The amount of the water mentioned above to be incorporated, namely the unit amount of water, has no particular restriction. It is, however, recommended that the unit amount of water be in the range of 120–200 kg/m³ based on 1 m³ of the concrete to be used. The ratio of the amounts of the cement and the water to be incorporated, i.e. the water/cement ratio, is properly adjusted to fall in the range of 20–70, preferably 30–60. When the cement additive and the cement admixture of this invention contain water, the amount of water contained therein is automatically included in the amount of the water contained in the cement composition.

(H) Method for manufacture of cement composition

The manufacture of the cement composition of this invention is not particularly discriminated by the kind of method to be adopted. Any of the known methods of manufacture can be adopted. In the manufacture of mortar or concrete as a cement composition, for example, generally as a first step, (1) cement and a fine aggregate such as sand are placed in a suitable mixer and subjected to dry mixing therein. As a result, the fine aggregate and the cement are uniformly mixed.

(2) Then, the mixing water and further the cement admixture of this invention which contains the cement additive formed of the polymer obtained by polymerizing the monomer component having the aforementioned methyl acrylate as a main component, the cement water reducing agent, etc. are thrown into the fine aggregate/cement blend prepared by the dry mixing in (1) above and are mixed therewith therein. This mixing results in producing a uniform mortar. These two steps constitute themselves a method for the manufacture of mortar.

(3) Optionally, a coarse aggregate such as gravel is thrown into the mortar manufactured by the mixing of (2) above and further mixed therewith to effect manufacture of a concrete.

Besides the method of manufacture of the cement composition in accordance with the procedure mentioned above, this invention permits adoption of a method which comprises kneading the cement, the mixing water, and optionally the aggregate and then adding to the resultant cement compound (which refers herein to the compound of the cement composition excepting the cement admixture) the cement admixture of this invention and a method which comprises dispersing or dissolving the cement admixture of this invention in the whole or in part of the mixing water to be used for the mixing and then kneading the resultant dispersion or solution with the cement and the aggregate.

The means (device) to be used for throwing the composition into the mixing water held in the mixing system and mixing it therein has no particular restriction except for the requirement that it be possessed of the ability to dry mix the cement and the aggregate and further the ability to effecting thorough mixture of the cement admixture containing the cement water reducing agent and the cement additive and the coarse aggregate which have been thrown into the components of the composition. Any of the varying kinds of mixer (mixing device) which have been heretofore used for the manufacture of a cement composition such as a concrete can be adopted without modification. As concrete examples of the mixer, a forced mixing type mixer, a horizontal uniaxial mixer, a horizontal biaxial mixer, a drum type mixer, a tilting type mixer, and a continuous mixer may be cited.

Embodiment

Now, working examples of this invention will be cited below. It should be noted, however, that these examples are cited purely for the purpose of illustration and not for limiting the scope of this invention. Wherever "parts" and "%" are mentioned herein after, they refer respectively to "parts by weight" and "% by weight".

(1) Method for manufacture of cement admixture

EXAMPLE 1

In a flask provided with a dropping funnel, a stirrer, a nitrogen inlet tube, a thermometer, and a condenser, 666 parts of deionized water and 9 parts of HITENOL N-08 (made by Dai-ichi Kogyo Seiyaku Co., Ltd.) were placed and then stirred at 72° C. until thorough solution of HITENOL N-08. The air entrapped in the flask was displaced with nitrogen which was gently introduced into the flask while the flask was kept at an inner temperature of 72° C. After the displacement with nitrogen was thoroughly effected, 30 parts of a monomer mixture formed preparatorily by mixing 45 parts of methacrylic acid with 255 parts of methyl acrylate was thrown through the dropping funnel into the flask and stirred therein for five minutes. Then, 25 parts of an aqueous 5% potassium persulfate solution was thrown into the flask and stirred continuously for 10 minutes with the inner temperature of the flask kept at 72° C. to effect initial polymerization. To the product of the initial polymerization, the balance 270 parts of the monomer mixture mentioned above was added dropwise over a period of two hours. After the dropwise addition was completed, the contents of the flask were continuously stirred for one hour with the inner temperature kept at 72° C. and then cooled to terminate the polymerization and obtain an aqueous resin dispersion (1), an emulsion having a non-volatile concentration of 30.9%.

EXAMPLE 2

In a flask provided with two dropping funnels, a stirrer, a nitrogen inlet tube, a thermometer, and a condenser, 327 parts of deionized water and 4 parts of HITENOL N-08 (made by Dai-ichi Kogyo Seiyaku Co., Ltd.) were placed and then stirred at 72° C. until thorough solution of HITENOL N-08. The air entrapped in the flask was displaced with nitrogen which was gently introduced into the flask while the flask was kept at an inner temperature of 72° C. After the displacement with nitrogen was thoroughly effected, 30 parts of a preemulsion mixture formed preparatorily by forced stirring 105 parts of methacrylic acid with 195 parts of methyl acrylate and 300 parts of an aqueous 1.6% HITENOL N-08 solution was thrown through the dropping funnel into the flask and stirred therein for five minutes. Then, 1 part of an aqueous 5% potassium persulfate solution and 4 parts of an aqueous 1% ammonium persulfate solution were thrown into the flask and stirred continuously for 20 minutes with the inner temperature of the flask kept at 72° C. to effect initial polymerization. To the product of the initial polymerization, the balance 570 parts of the preemulsion mixture mentioned above and 64 parts of an aqueous 1% ammonium persulfate were added dropwise over a period of two hours. After the dropwise addition was completed, the contents of the flask were continuously stirred for one hour with the inner temperature elevated to 80° C. and then cooled to terminate the polymerization and obtain an aqueous resin dispersion (2), an emulsion having a non-volatile concentration of 30.8%.

EXAMPLE 3

An aqueous resin dispersion (3) having a non-volatile concentration of 30.9% was obtained by following the procedure of Example 2 while using a preemulsion mixture obtained by forced stirring 75 parts of methacrylic acid, 120 parts of methyl acrylate, 105 parts of ethyl acrylate, and 300 parts of an aqueous 1.6% HITENOL N-08 solution in the place of the preemulsion mixture mentioned in Example 2.

EXAMPLE 4

The aqueous resin dispersion (2), an emulsion mentioned in Example 2, was placed in an eggplant type flask and the emulsion was frozen on the inner wall of the eggplant type flask by rotating the eggplant type flask in a thermally insulated container containing liquefied nitrogen. After the emulsion was frozen, the eggplant type flask was set in a freeze drying device and then vacuumized to effect desiccation of the emulsion. The desiccation of the emulsion completed in about six hours. As a result, 30 parts of a powder having a particle diameter of not more than several μm. This powder was labeled as a freeze dried product (solid) of the dispersion (2).

(Control 1)

In a flask provided with two dropping funnels, a stirrer, a nitrogen inlet tube, a thermometer, and a condenser, 327 parts of deionized water and 4 parts of HITENOL N-08 (made by Dai-ichi Kogyo Seiyaku Co., Ltd.) were placed and then stirred at 72° C. until thorough solution of HITENOL N-08. The air entrapped in the flask was displaced with nitrogen which was gently introduced into the flask while the flask was kept at an inner temperature of 72° C. After the displacement with nitrogen was thoroughly effected, 30 parts of a preemulsion mixture formed preparatorily by forced stirring 105 parts of methacrylic acid with 195 parts of ethyl acrylate and 300 parts of an aqueous 1.6% HITENOL N-08 solution was thrown through the dropping funnel into the flask and stirred therein for five minutes. Then, 1 part of an aqueous 5% sodium hydrogen sulfite solution and 4 parts of an aqueous 1% ammonium persulfate solution were thrown into the flask and stirred continuously for 20 minutes with the inner temperature of the flask kept at 72° C. to effect initial polymerization. To the product of the initial polymerization, the balance 570 parts of the preemulsion mixture mentioned above and 64 parts of an aqueous 1% ammonium persulfate were added dropwise over a period of two hours. After the dropwise addition was completed, the contents of the flask were continuously stirred for one hour with the inner temperature elevated to 80° C. and then cooled to terminate the polymerization and obtain an aqueous resin dispersion (1) for comparison, an emulsion having a non-volatile concentration of 30.8%.

(Control 2)

An aqueous resin dispersion (2) for comparison, an emulsion having a non-volatile concentration of 30.8%, was obtained by following the procedure of Control 1 while using a preemulsion mixture obtained by forced stirring 120 parts of methacrylic acid, 72 parts of methyl acrylate, 108 parts of ethyl acrylate, and 300 parts of an aqueous 1.6% HITENOL N-08 solution in the place of the preemulsion mixture mentioned in Control 1.

For the sake of confirmation, the monomer compositions used for the manufacture of the aqueous resin dispersions and the aqueous resin dispersion for comparison which were respectively obtained in Examples 1–4 and Controls 1 and 2 mentioned above are collectively shown briefly in Table 1 below.

TABLE 1

| | | Monomer composition (% by weight based on the weight of monomer) | | | Involatile content (%) |
|---|---|---|---|---|---|
| | Cement additive | Methacrylic acid | Methyl acrylate | Ethyl acrylate | |
| example 1 | Aqueous resin dispersion (1) | 45 (15%) | 255 (85%) | — | 30.9 |
| example 2 | Aqueous resin dispersion (2) | 105 (35%) | 195 (65%) | — | 30.8 |
| example 3 | Aqueous resin dispersion (3) | 75 (25%) | 120 (40%) | 105 (35%) | 30.9 |
| example 4 | Freeze dried product of dispersion (2) | 105 (35%) | 195 (65%) | — | 100 |
| control 1 | Aqueous resin dispersion (1) for comparison | 105 (35%) | — | 195 (65%) | 30.8 |
| control 2 | Aqueous resin dispersion (2) for comparison | 120 (40%) | 72 (24%) | 108 (36%) | 30.8 |

(2) Method for manufacture of cement composition (concrete) by use of cement additive

EXAMPLES 5–8 and CONTROLS 3 and 4

Ordinary Portland cement (made by Chichibu-Onoda Cement K. K.; specific gravity 3.16) was used as cement, land sand produced in the basin of Oi River (specific gravity 2.62, FM 2.71) as a fine aggregate, and crushed stones of stiff sand produced in Oume (specific gravity 2.64, MS 20 mm) as a coarse aggregate.

As a cement water reducing agent, the naphthalene sulfonic acid-formalin condensate (made by Kao Corporation and sold under the trademark designation of "Mighty 150") available commercially as a cement dispersion agent which was fixed with cement at a ratio of 1.2 wt. % based on the weight of cement was used. As cement additives (thickeners), the aqueous resin dispersions (1)–(3), the freeze dried product (2), and the aqueous resin dispersions (1) and (2) for comparison which were respectively obtained in Examples 1–4 and Controls 1 and 2 mentioned above were used. A commercially available defoamer was used for adjusting the amount of air entrained.

The compounding conditions for cement composition (concrete herein) were 500 kg/m³ of unit amount of cement, 165 kg/m³ of unit amount of water, and 45% of fine aggregate ratio.

The raw materials and the cement compositions (concretes herein) mentioned above were compounded under the conditions mentioned above to manufacture concretes by following the procedure described below.

(1) In a forced mixing type mixer, 50 liters in inner volume, 44.2 kg of the fine aggregate and 25.0 kg of the ordinary Portland cement were placed and subjected to dry mixing for ten seconds.

(2) In the fine aggregate/cement formed in (1) above, 8.11 kg of a fixing water containing a cement water reducing agent and a cement additive (thickener) added respectively in the amounts shown in Table 2 below was thrown and mixed. The time required for the mortar to be uniformized was clocked. The lengths of mixing time shown in Table 2 were required for the uniformization of mortar. After the mortar was uniformized, the mixing was further continued for 30 seconds.

(3) Evaluation of quality of concrete

The concretes produced respectively by the procedures shown in (1)–(3) were tested for slump value and flow value.

Method of measurement

The slump value and the flow value were measured by following the procedures specified in Japanese Industrial Standard (JIS A 1101, 1128), with necessary modifications. The results are shown in Table 2.

TABLE 2

| | Cement additive | Amount of addition (wt. %/C): Time for mixing mortar (in seconds) | | Time for mixing mortar (seconds) | Flow value | Slump value |
|---|---|---|---|---|---|---|
| | | additive | dispersion | | | |
| example 5 | Aqueous resin dispersion (1) | 0.02 | 1.2 | 20 | 650 | 25.0 |
| example 6 | Aqueous resin dispersion (2) | 0.02 | 1.2 | 100 | 600 | 25.0 |
| example 7 | Aqueous resin dispersion (3) | 0.05 | 1.2 | 58 | 695 | 25.0 |
| example 8 | Freeze dried product of dispersion (2) | 0.02 | 1.2 | 115 | 600 | 25.0 |
| control 3 | Aqueous resin dispersion (1) for comparison | 0.12 | 1.2 | 147 | 673 | 24.0 |
| control 4 | Aqueous resin dispersion (2) for comparison | 0.06 | 1.2 | 165 | 512 | 22.7 |

It is confirmed by comparing the aqueous resin dispersions (1)–(3), the freeze dried product of the dispersion (2), and the aqueous resin dispersions (1) and (2) for comparison obtained respectively in Examples 1–4 and Controls 1 and 2 that the function and the effect aimed at could be manifested when the aqueous resin dispersions (1) and (2) and the freeze dried product of the dispersion (2) which used methyl acrylate were invariably incorporated at a ratio of 0.02 wt. % and the aqueous resin dispersion (3) was incorporated at a ratio of 0.05 wt. %, whereas the aqueous resin dispersion (1) for comparison was incorporated at a ratio of 0.12 wt. % and the aqueous resin dispersion (2) for comparison at a ratio of 0.06 wt. %. Thus, the aqueous resin dispersions (1) and (2) and the freeze dried product of the dispersion (2) were demonstrated to bring marked decreases in the amounts of addition.

The lengths of time required for mixing mortars were 20 seconds, 100 seconds, and 58 seconds respectively in Examples 5–8 using the aqueous resin dispersions (1)–(3) and the freeze dried product of dispersion (2), whereas they were 147 seconds in Control 3 using the aqueous resin dispersion (1) for comparison and 165 seconds in Control 4 using the aqueous resin dispersion (2) for comparison. These results demonstrate that the products according to this invention were invariably capable of markedly decreasing the lengths of time required for the mixing.

What is claimed is:

1. A cement admixture comprising a polymer obtained by a process which comprises polymerizing a methyl acrylate monomer and other copolymerizable monomers, wherein the methyl acrylate monomer is the most abundant monomer among all monomers in the polymerization reaction; and a cement water reducing agent in an amount ranging from 0.01 to 10 parts by weight based on 100 parts by weight of the polymer.

2. A cement admixture according to claim 1, wherein the amount of the methyl acrylate monomer ranges from 40% by weight to 100% by weight based on the weight of the monomers.

3. A cement composition comprising a polymer obtained by a process which comprises polymerizing a methyl acrylate monomer and other copolymerizable monomers, wherein the methyl acrylate monomer is the most abundant monomer among all monomers in the polymerization reaction; and cement;

wherein the polymer is in an amount ranging from 0.001 to 5% by weight based on the weight of the cement.

4. A cement composition according to claim 3, wherein the amount of the methyl acrylate monomer ranges from 40% by weight to 100% by weight based on the weight of the monomers.

5. A cement composition comprising a polymer obtained by a process which comprises polymerizing a methyl acrylate monomer and other copolymerizable monomers, wherein the methyl acrylate monomer is the most abundant monomer among all monomers in the polymerization reaction;

a cement water reducing agent in an amount ranging from 0.01 to 10 parts by weight based on 100 parts by weight of the polymer; and cement;

wherein the polymer is in an amount ranging from 0.001 to 5% by weight based on the weight of the cement.

6. A cement composition according to claim 5, wherein the amount of the methyl acrylate monomer ranges from 40% by weight to 100% by weight based on the weight of the monomers.

* * * * *